United States Patent [19]

Walle

[11] 4,378,692
[45] Apr. 5, 1983

[54] LEAK DETECTING MONITOR
[75] Inventor: L. Irwin Walle, Largo, Fla.
[73] Assignee: Air Monitor Co., Inc., Largo, Fla.
[21] Appl. No.: 288,683
[22] Filed: Jul. 31, 1981
[51] Int. Cl.[3] .............................................. G01M 3/32
[52] U.S. Cl. ...................................... 73/49.2; 73/716
[58] Field of Search ................... 73/49.2, 40, 715, 716, 73/744

[56] References Cited

U.S. PATENT DOCUMENTS 3,653,264  4/1972  Mills ................................ 73/49.2 X
4,157,656  6/1979  Walle ................................. 73/49.2

Primary Examiner—Charles A. Ruehl
Assistant Examiner—Joseph W. Roskos
Attorney, Agent, or Firm—Stanley M. Miller

[57]  ABSTRACT

The monitor employs a sensing piston whose position is balanced by offsetting the pressure to be monitored on one side of the piston by a reference pressure of approximately equal magnitude on the other side of the piston. A balance valve on the sensing piston controls the rate of flow of the reference gas from a first chamber bounded on one side by the sensing piston, into a second chamber bounded on one side by a signal piston having a striker whose surface is positioned proximate to the outlet of a gas jet tube. The gas jet tube is connected to a sensing gas pressure source and pressure detector and will produce a pneumatic signal when the striker surface of the signal piston blocks the outlet of the jet tube. Pneumatic signals are produced by the gas jet tube in response to the reference gas being admitted from the first chamber to the second chamber through the balance valve, which occurs in response to a decrease in the pressure to be monitored with respect to the reference gas pressure which displaces the sensing piston, thereby actuating the balance valve. A regulating valve in an outlet port of the second chamber establishes a minimum threshold value for the magnitude of the rate of flow of the reference gas from the first chamber to the second chamber. Thus, small variations in the magnitude of the reference gas pressure in the first chamber due, for example, to variations in the supply pressure, will not cause the production of erroneous pneumatic signals by the gas jet tube.

10 Claims, 9 Drawing Figures

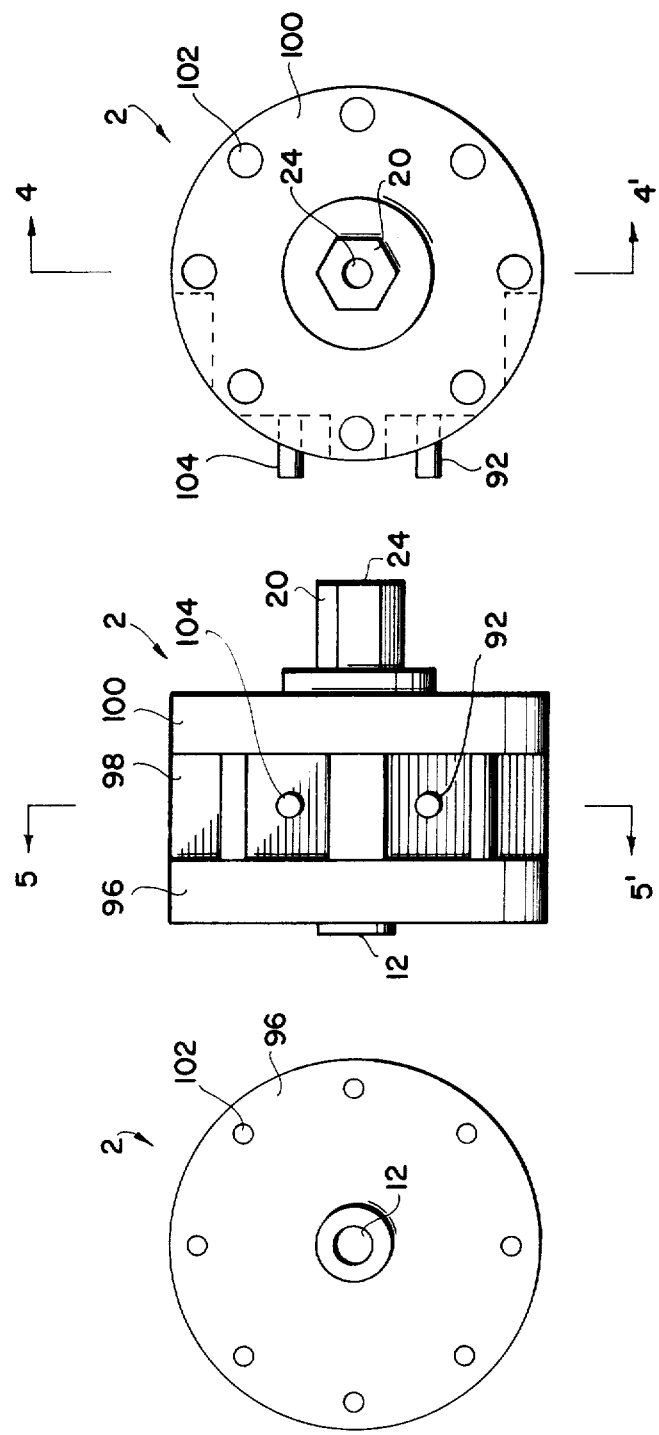

SEC. 4-4'

FIG. 5
SEC. 5-5'
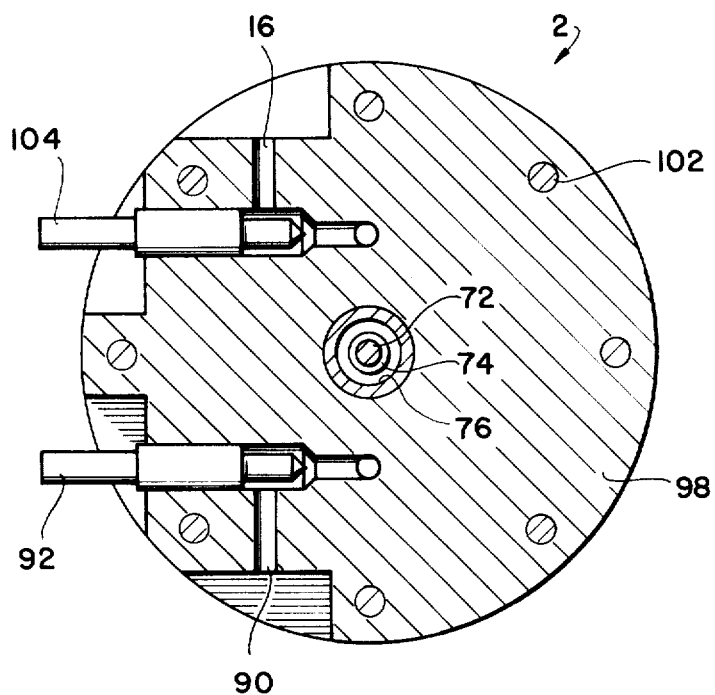
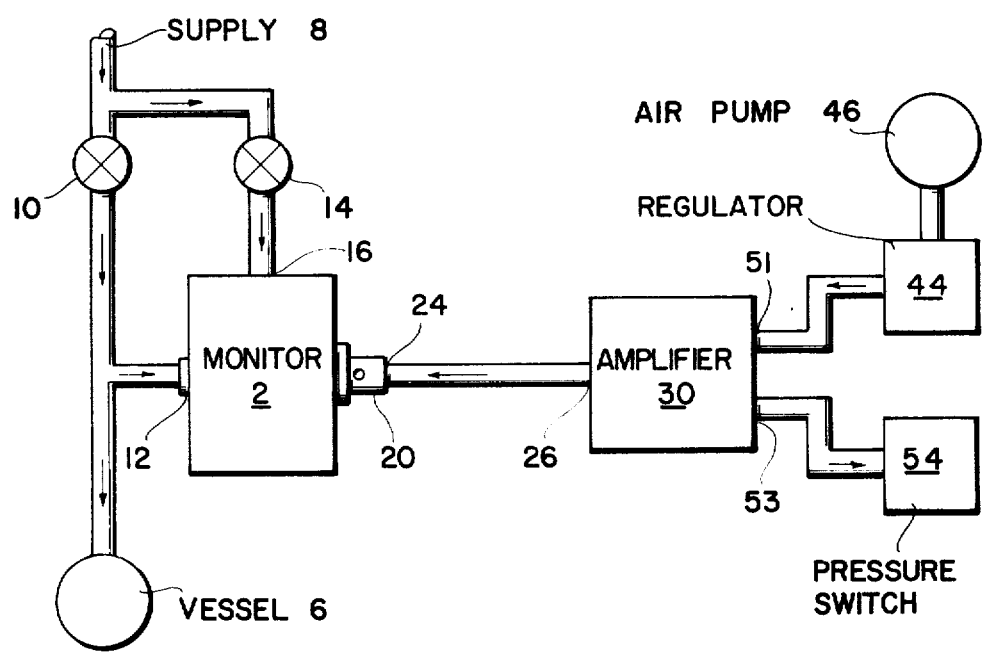
FIG. 9

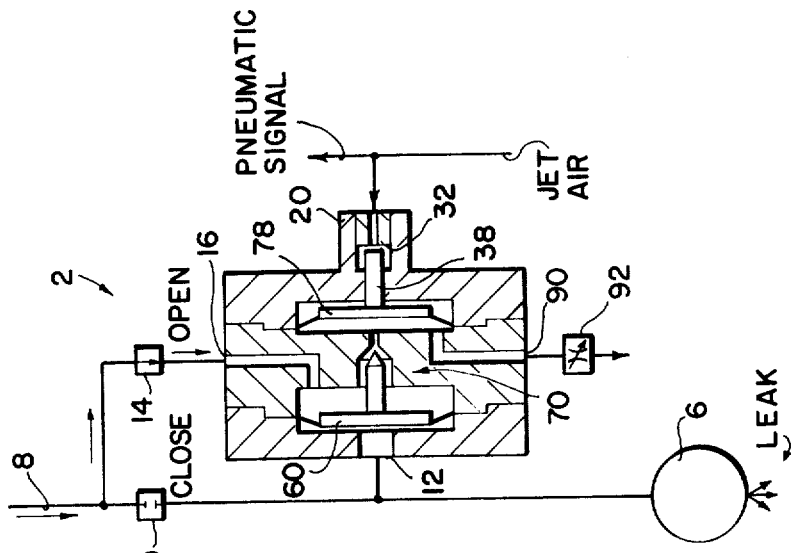
FIG. 6 FILL
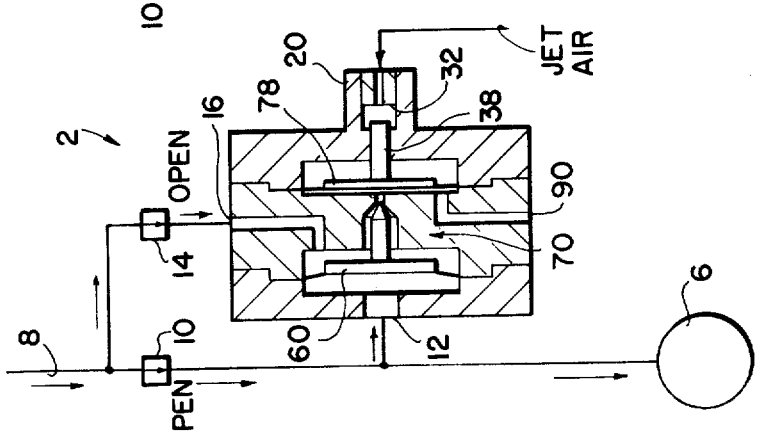
FIG. 7 BALANCE
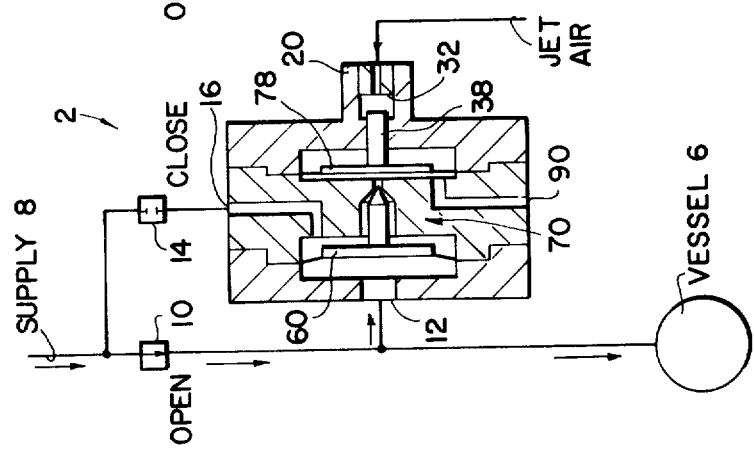
FIG. 8 UNBALANCE

LEAK DETECTING MONITOR

FIELD OF THE INVENTION

The invention disclosed broadly relates to measurement apparatus and more particularly relates to fluid leak detection apparatus.

BACKGROUND OF THE INVENTION

A very successful prior art system for detecting the leakage of fluid from a container is disclosed in U.S. Pat. No. 4,157,656 by L. I. Walle, entitled Leak Detection System, issued June 12, 1979. The leak detection system disclosed therein includes a monitor which employs an axially displaceable piston having a first surface exposed to fluid pressure within the container and having a second surface opposed to the first surface, with a first portion exposed to a reference gas pressure and a second portion upon which is mounted a striker surface. A gas jet tube is mounted in proximity to the striker surface and has an inlet connected to a pressure sensing source and a sensing gas pressure detector. Changes in the relative magnitude of the fluid pressure within the container with respect to the preference gas pressure will cause the piston to alternately block and unblock the outlet of the gas jet tube, providing a pneumatic signal.

The monitor described in the Walle patent works very well and has met with significant success when applied using reference gas pressure sources which are well regulated and in container leakage measurement operations which are conducted at moderate speed. However, when this prior art monitor is attempted to be employed with poorly regulated reference gas pressure sources, it is possible that erroneous pneumatic signals will be produced by the gas jet tube when transient over-pressured conditions take place in the reference gas pressure source line. Alternately, the fast fill of a container being tested, as is sometimes required by production standards, often results in a marginal pressure achievement. When the pressure from the same regulator is applied to both the vessel under test and the balance side of the piston, since the charging pressure to the vessel is switched off while the reference pressure to the balancing side of the piston remains on, the balancing, reference pressure may achieve its full capacity from the pressure regulator which may sometimes be greater than the pressure in the vessel and thus sufficient to unseat the striker surface from the outlet of the gas jet tube, thereby producing an erroneous pneumatic signal.

OBJECTS OF THE INVENTION

It is therefore an object of the invention to provide an improved leak detecting monitor.

It is still another object of the invention to provide a leak detecting monitor which is more immune to spurious reference pressure variations, than has been available in the prior art.

It is still a further object of the invention to provide an improved leak detecting monitor which is capable of more rapid, repetitive operation without producing erroneous signals, than has been available in the prior art.

SUMMARY OF THE INVENTION

These and other objects, features and advantages of the invention are provided by the leak detecting monitor disclosed herein. An improved leak detecting monitor is disclosed which is more immune to reference air pressure variations than are prior art leak detecting monitors. The improved leak detecting monitor is employed in measuring the leakage of a fluid from a container by measuring the decay of the fluid pressure from an initial charging pressure. The monitor employs a sensing piston whose position is balanced by offsetting the fluid pressure to be monitored on one side of the piston by a reference pressure of approximately equal magnitude on the other side of the piston. A balance valve is mounted on the sensing piston and controls the rate of flow of the reference gas from a first chamber bounded on one side by the sensing piston, into a second chamber bounded on one side by a signal piston. The signal piston has a striker whose surface is positioned proximate to the outlet of a gas jet tube. The gas jet tube is connected to a sensing gas pressure souce and pressure detector and will produce a pneumatic signal detectable by the detector when the striker surface of the signal piston blocks the outlet of the jet tube. Thus, pneumatic signals are produced by the gas jet tube in response to the reference gas being admitted from the first chamber to the second chamber through the balance valve, which occurs in response to a decrease in the fluid pressure to be monitored with respect to the reference gas pressure which displaces the sensing piston, thereby actuating the balance valve. A regulating valve in an outlet port of the second chamber establishes a minimum threshold value for the magnitude of the rate of flow of the reference gas from the first chamber to the second chamber. In this manner, small variations in the magnitude of the reference gas pressure in the first chamber due, for example, to variations in the supply pressure, will not cause the production of erroneous pneumatic signals by the gas jet tube.

DESCRIPTION OF THE FIGURES

These and other objects, features and advantages of the invention will be more fully appreciated with reference to the accompanying figures.

FIG. 1 is a side view of the leak detecting monitor.

FIG. 2 is a back view of the leak detecting monitor.

FIG. 3 is a front view of the leak detecting monitor.

FIG. 5 is a front cross-sectional view along the section line 5—5' of FIG. 1.

FIG. 6 is a side view of the leak detecting monitor during a first, filling operation.

FIG. 7 is a side view of the leak detecting monitor during a second, balancing operation.

FIG. 8 is a side view of the leak detecting monitor during a third, leakage detecting operation.

FIG. 9 is a schematic representation of the interconnection of the leak detection monitor 2 with the test vessel 6 and the pneumatic amplifier 30.

DISCUSSION OF THE PREFERRED EMBODIMENT

Figure 4:
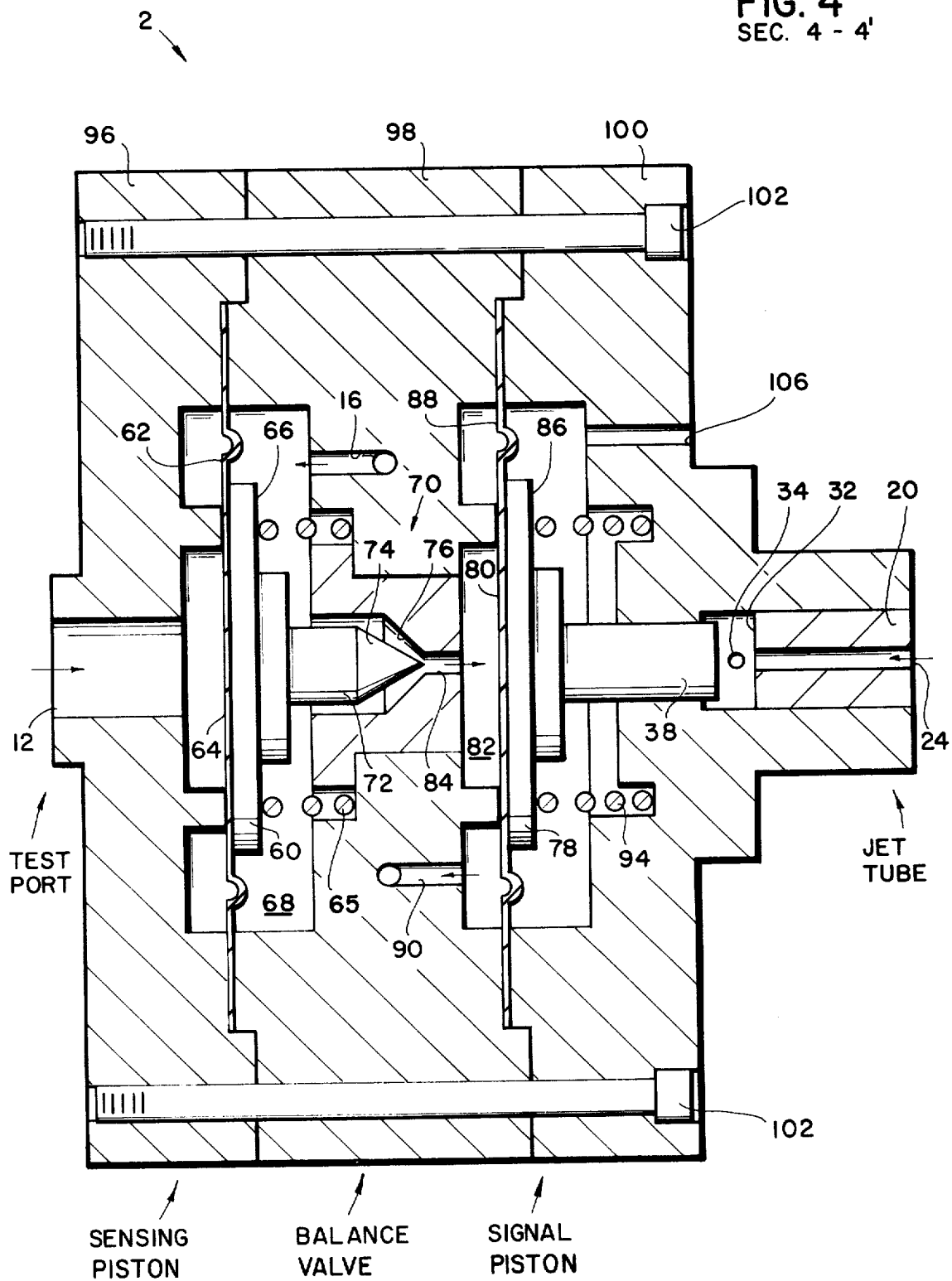
FIG. 4 is a side cross-sectional view along the section 4—4' of FIG. 3.

An improved leak detecting monitor is disclosed which is more immune to reference air pressure variations than are prior art leak detecting monitors. The improved leak detecting monitor is employed in measuring the leakage of a fluid from a container by measuring the decay of the fluid pressure from an initial charging pressure. The monitor employs a sensing piston whose position is balanced by offsetting the fluid pressure to be monitored on one side of the piston by a reference pressure of approximately equal magnitude on the other side of the piston. A balance valve is mounted on the sensing piston and controls the rate of flow of the reference gas from a first chamber bounded on one side by the sensing piston, into a second chamber bounded on one side by a signal piston. The signal piston has a striker whose surface is positioned proximate to the outlet of a gas jet tube. The gas jet tube is connected to a sensing gas pressure source and pressure detector and will produce a pneumaic signal detectable by the detector when the striker of the signal piston blocks the outlet of the jet tube. Thus, pneumatic signals are produced by the gas jet tube in response to the reference gas being admitted from the first chamber to the second chamber through the balance valve, which occurs in response to a decrease in the fluid pressure to be monitored with respect to the reference gas pressure which displaces the sensing piston, thereby actuating the balance valve. A regulating valve in an outlet port of the second chamber establishes a minimum threshold value for the magnitude of the rate of flow of the reference gas from the first chamber to the second chamber. In this manner, small variations in the magnitude of the reference gas pressure in the first chamber due, for example, to variations in the supply pressure, will not cause the production of erroneous pneumatic signals by the gas jet tube.

FIGS. 1-5 show various views of the leak detecting monitor, FIGS. 6, 7 and 8 show the sequence of operations of filling the test vessel, balancing the sensing piston, and measuring the leakage from the test vessel, and FIG. 9 is a schematic illustration of the interconnection of the monitor 2 with the test vessel 6, the test air supply 8 and the pneumatic amplifier 30. The principles of the operation of the gas jet tube 20 in the monitor 2 and the pneumatic amplifier 30 are provided in significant detail in the above referenced Walle patent, the disclosure of which is incorporated herein by reference. Various measurement techniques for carrying out pressure drop tests and achieved pressure tests on vessels under test are also described in detail in the Walle patent.

The leak detecting monitor 2 includes an axially displaceable sensing piston 60 which is mounted by means of the flexible diaphragm 62 between the respective faces of the test head 96 and the balance head 98 of the body of the monitor 2, as is shown in FIG. 4. The sensing piston 60 has a first surface 64 which is connected through the fluid pressure inlet port 12 and through the vessel charging valve 10 to the test air supply 8 and it is also connected to the vessel 6 being tested for leakage. A second surface 66 of the sensing piston 60, opposite to the first surface 64, has a first portion exposed within the first chamber 68 to the reference gas pressure which is supplied through the reference gas pressure input 16 which is, in turn, connected through the balance chamber check valve 14 to the test air supply 8. When both the vessel charging valve 10 and the balance chamber check valve 14 are on, approximately equal fluid pressures are applied on both the first surface 64 and the second surface 66 of the sensing piston 60.

A balance valve 70 has an axially displaceable valve stem 72 mounted on the second portion of the sensing piston 60 and within the first chamber 68. The balance valve 70 has a valve face 74 which is formed on the valve stem 72. The balance valve 70 also has a valve seat 76 which is formed in the balance head 98, which operatively mates with the valve face 74 when the valve stem 72 is axially displaced in conjunction with the axial displacement of the sensing piston 60 in response to changes in the relative magnitude of the fluid pressure at the inlet 12 with respect to the reference gas pressure in the first chamber 68. Since the area of the second surface 66 of the sensing piston 60 is slightly reduced by the area of the seated balance valve 70, the sensing piston 60 will not move when the balancing reference pressure is applied in the first chamber 68, and the balancing valve 70 will remain closed. This is the balanced condition which is obtained when the fluid pressure in the inlet 12 is approximately equal to the reference gas pressure in the first chamber 68.

A lightly biased compression spring 65 may be mounted on the sensing piston 60 to assist the opening of the balance valve 70 when the relative magnitude of the fluid pressure at the inlet 12 becomes less than the magnitude of the reference gas pressure in the first chamber 68.

The leak detecting monitor further includes an axially displaceable signal piston 78 which is mounted on a flexible diaphragm 88 between the respective faces of the balance head 98 and the signal head 100 of the monitor, as is shown in FIG. 4. The signal piston 78 has a first surface 80 which is exposed to gas pressure in a second chamber 82 which communicates by means of the passage 84 through the valve seat 76 of the balance valve 70, with the first chamber 68. The signal piston 78 has a second surface 86 which is opposite to the first surface 80, which is exposed through the passage 106 to the ambient.

The leak detecting monitor further includes the gas jet tube 20 which has an inlet 24 connected to a sensing gas pressure source 46. The inlet 24 is connected to the amplifier outlet 26 of the amplifier 30. The amplifier inlet port 51 is connected through the regulator 44 to the air pump 46. The inlet 24 of the gas jet tube 20 is also connected through the amplifier outlet port 53 to the sensing gas pressure detector 54 which is a pressure switch. The gas jet tube 20 has an outlet 32 which is proximate to the surface of the striker 38 which is mounted to the second surface 86 of the signal piston 78. The gas jet tube 20 has a vent 34 adjacent to the outlet 32. which permits the venting of the sensing gas passing through the jet tube 20 to the ambient. The striker surface 38 will abut with the outlet 32 of the jet tube 20 when the signal piston 78 is axially displaced toward the jet tube 20 by an increase in the pressure of the gas within the second chamber 82. When this occurs, the flow of sensing gas into the inlet 24 of the jet tube 20 and out of the outlet 32, is stopped and this condition is sensed by the pneumatic amplifier 30. Alternately, when the pressure of the gas within the second chamber 82 decreases, the lightly biased spring 94 mounted on the signal piston 78, which has a bias force opposed to the gas pressure in the second chamber 82, will withdraw the striker surface 38 from its abutting position with the outlet 32 of the jet tube 20, thereby unblocking the outlet 32 and allowing the sensing gas to flow once again through the jet tube 20. This state can be detected in the amplifier 30.

The signal piston 78 will block the outlet 32 of the gas jet tube 20, thereby producing a pneumatic signal which is detectable by the detector 54, in response to the reference gas being emitted from the first chamber 68 to the second chamber 82 through the valve seat 76. This occurs in response to a decrease in the fluid pressure at the inlet 12 which is to be monitored, with respect to the reference gas pressure within the first chamber 68, which decrease will axially displace the sensing piston 60, thereby moving the valve face 74 away from the valve seat 76 of the balance valve 70.

The leak detecting monitor 2 further includes an outlet port 90 which communicates with the second chamber 82. A gas flow regulating valve 92 is connected to the outlet port 90, for controlling the rate of flow of the reference gas out of the second chamber 82. The regulating valve 92 establishes a minimum threshold value for the magnitude of the rate of flow of the reference gas from the first chamber 68 into the second chamber 82. Thus, the regulating valve 92 also establishes a minimum threshold value for the gas pressure within the second chamber 82. This minimum threshold gas pressure must be exceeded before the striker surface 38 will abut with the outlet 32 of the gas jet tube 20 to produce a pneumatic signal. Since the rate of flow of the reference gas from the first chamber 68 into the second chamber 82 must exceed the minimum threshold rate of flow established by the regulating valve 92, small variations in the magnitude of the reference gas pressure in the front chamber 68, caused for example by variations in the supply pressure from the test air supply 8 or alternately caused by too rapid a measurement operation with respect to the delivery rate characteristics of the test air supply regulator, will not cause the production of erroneous pneumatic signals by the gas jet tube 20.

The leak detecting monitor 2 can be readily employed in a pressure drop test on a test vessel 6. A test vessel 6 is filled with pressurized fluid to a required pressure. This is accomplished by attaching the test vessel 6 to the system and opening the vessel charging valve 10. This also directs pressurized fluid through the inlet 12 into the monitor 2. The test air pressure in the monitor energizes the sensing piston 60, which closes the balance valve 70. This condition is shown in FIG. 6. When the fluid pressure in the test vessel 6 achieves the required magnitude, the balance chamber check valve 14 is opened, permitting the testing fluid to enter the balancing chamber or first chamber 68. This condition is illustrated in FIG. 7. As was described above, since the pressure on the first surface 64 and the second surface 66 of the sensing piston 60 is approximately the same, it will be in a balanced state and the balancing valve 70 will remain closed. After a short period of time has elapsed to permit pressure stabilization, the fluid pressure to the test vessel 6 and to the inlet 12 of the monitor 2 is shut off by closing the vessel charging valve 10. This is the condition which is shown in FIG. 8. If the test vessel 6 does not leak, the monitor 2 will remain in the balanced condition as shown in FIG. 7 until the testing interval has elapsed, and the striker surface 38 will not contact the outlet 32 of the gas jet tube 20 and therefore no pneumatic signal will be generated. Alternately, if the pressure in the test vessel 6 decays because of leakage, the reference pressure within the first chamber 68 will push the sensing piston 60 and displace it so as to open the balancing valve 70, thereby permitting reference gas to flow through the passage 84 into the second chamber 82. If the rate of flow of the reference gas through the passage 84 into the second chamber 82 exceeds the minimum threshold value for the rate of flow established by the gas flow regulating valve 92, then the signal piston 78 will displace the striker surface 38 toward the outlet 32 of the gas jet tube 20, thereby producing a pneumatic signal, as is shown in FIG. 8.

The valve face 74 of the balance valve 70 has a conical contour with an axis coincident with the direction of axial displacement of the valve stem 72 and a conical angle with respect to the axis, having a first magnitude of approximately 30°. The valve seat 76 of the balance valve 70 has a conical contour with an axis coincident with the axis of the valve face 74 and a conical angle with respect to the axis, having a second magnitude of approximately 45°, greater than the first magnitude for the valve face 74. In this manner, a small displacement of the valve face 74 away from the valve seat 76 will provide a small rate of flow of the reference gas from the first chamber 68 to the second chamber 82 which will be less than the threshold of value. However, a larger displacement of the valve face 74 away from the valve seat 76 will provide a disproportionately larger rate of flow of the reference gas greater than the threshold flow value. In this manner, small noise variations in the reference gas pressure within the first chamber 68 can be significantly distinguished from real, measurable variations in the fluid pressure at the inlet 12.

Achieved pressure testing can also be conducted with the monitor 2. The reference gas pressure is applied through the inlet port 16 into the fist chamber 68 and can be made greater than the magnitude of the fluid pressure at the inlet port 12 at a first time. Thereafter, the fluid pressure in the test vessel is increased to approximately the same magnitude as the reference gas pressure within the first chamber 68. If the test vessel 6 does not leak, the increase in the fluid pressure within the vessel 6 and at the inlet port 12 to a magnitude approximately equal to the reference gas pressure in the first chamber 68, will close the balance valve 70 and cause the striker surface 38 to unblock the outlet 32 of the gas jet tube 20 at a time subsequent to the first time.

The leak detecting monitor 2 is also furnished with a balance damper valve 104 which controls the rate of flow of the reference gas through the inlet port 16 to the first chamber 68. This is employed to prevent a sudden surge of pressure being applied to the second surface 66 of the sensing piston 60 when the balance chamber check valve 14 is opened, which could otherwise unseat the balance valve 70. The higher the test pressure from the test air supply 8, the smaller must be the orifice provided by the balance damper valve 104 in order to dampen the gas flow into the first chamber 68.

The gas flow regulating valve 92 will control the measurement sensitivity of the monitor 2. As the balancing valve 70 is unseated, it permits air to flow from the first chamber 68 into the second chamber 82 at a controlled rate, with that rate of flow increasing as the balance valve 70 opens wider. As was previously discussed, the gas flow regulating valve 92 permits a certain minimum threshold flow to escape from the second chamber 82 which will prevent a sufficient buildup of pressure on the signal piston 78 to actuate the gas jet tube 20. Adjusting the regulating valve 92 will change that threshold value and therefore the sensitivity of the monitor.

Although a specific embodiment of the invention has been disclosed, minor changes may be made to the structure without departing from the spirit and scope of the invention.

What is claimed is:

1. A fluid pressure monitor, comprising:

an axially displaceable sensing piston having a first surface exposed to a fluid pressure to be monitored and a second surface opposite to said first surface, having a first portion exposed to a reference gas pressure in a first chamber and a second portion not so exposed;

a balance valve having an axially displaceable valve stem mounted on said second portion of said sensing piston and within said first chamber, having a valve face formed on said valve stem and having a valve seat which operatively mates with said valve face when said valve stem is axially displaced in conjunction with the axial displacement of said sensing piston in response to changes in the relative magnitude of said fluid pressure to be monitored with respect to said reference gas pressure;

an axially displaceable signal piston having a first surface exposed to gas pressure in a second chamber which communicates through said valve seat of said balance valve with said first chamber, and a second surface opposite to said first surface;

said axial displacement of said balance valve controlling the rate of flow of said reference gas from said fist chamber to said second chamber;

a gas jet having an inlet connected to a sensing gas pressure source and sensing gas pressure detector and an outlet proximate to said second surface of said signal piston;

said signal piston blocking said outlet of said gas jet, producing a pneumatic signal detectable by said detector, in response to said reference gas being admitted from said first chamber to said second chamber through said valve seat in response to a decrease in said fluid pressure to be monitored with respect to said reference gas pressure which axially displaces said sensing piston, moving said valve face away from said valve seat of said balance valve.

2. The monitor of claim 1, which further comprises:
an outlet port communicating with said second chamber;
a gas flow regulating valve connected to said outlet port, for controlling the rate of flow of said reference gas out of said second chamber;
said regulating valve establishing a minimum threshold value for the magnitude of said rate of flow of said reference gas from said first chamber to said second chamber, and thus a minimum threshold value for the gas pressure within said second chamber, which must be exceeded before said pneumatic signal is produced by said gas jet;
whereby small variations in the magnitude of said reference gas pressure in said first chamber will not cause the production of erroneous pneumatic signals by said gas jet.

3. The monitor of claim 2, which further comprises:
a bias spring mounted on said signal piston, having a bias force opposed to said gas pressure in said second chamber, for preventing said signal piston from blocking said outlet of said gas jet until said gas pressure in said second chamber exceeds said minimum threshold pressure.

4. The monitor of claim 3, wherein:
said first surface of said sensing piston has a greater cross-sectional area than that of said fist portion of said second surface thereof;
whereby said balance valve will be closed when said reference presure is approximately equal to said fluid pressure to be monitored.

5. The monitor of claim 4, wherein:
said reference pressure in said first chamber is made approximately equal to said fluid pressure to be monitored at a first time;
whereby a reduction in the magnitude of said fluid pressure to be monitored will open said balance valve and block the outlet of said gas jet at a time subsequent to said first time.

6. The monitor of claim 5, wherein said reduction in the magnitude of said fluid pressure to be monitored represents a gas pressure leak.

7. The monitor of claim 4, wherein:
said first surface of said sensing piston is fluid-connected to a fluid pressure vessel to be monitored which is to be charged with a fluid pressure after a first time and said reference gas pressure in said first chamber is made greater than the magnitude of the fluid pressure in said fluid pressure vessel at said first time;
whereby the achievement of an increase in the fluid pressure in said vessel to a magnitude approximately equal to said reference gas pressure in said first chamber will close said balance valve and unblock the outlet of said gas jet at a time subsequent to said first time.

8. The monitor of claim 4, wherein said sensing piston further comprises:
a flexible diaphragm mounted in a cylindrical body, supporting said valve stem of said balance valve proximate to said valve seat.

9. The monitor of claim 4, wherein said signal piston further comprises:
a flexible diaphragm mounted in a cylindrical body, supporting a striker proximate to said outlet of said gas jet.

10. The monitor of claim 2, wherein said balance valve further comprises:
said valve face having a conical contour with an axis coincident with said axial displacement of said valve stem and a conical angle having a first magnitude;
said valve seat having a conical contour with an axis coincident with that of said valve face and a conical angle having a second magnitude greater than said first magnitude;
whereby a small displacement of said valve face away from said valve seat will provide a small rate of flow of said reference gas from said first chamber to said second chamber less than said threshold flow value, but a larger displacement of said valve face away from said valve seat will provide a disproportionately larger rate of flow of said reference gas greater than said threshold flow value.

* * * * *